United States Patent
Harada

(10) Patent No.: US 12,321,649 B2
(45) Date of Patent: Jun. 3, 2025

(54) APPARATUS, SYSTEM, MOBILE TERMINAL, NON-TRANSITORY COMPUTER READABLE MEDIUM, AND METHOD FOR MANAGING CONSUMABLES USED IN IMAGE FORMING APPARATUS

(71) Applicant: FUJIFILM Business Innovation Corp., Tokyo (JP)

(72) Inventor: Masahiko Harada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 312 days.

(21) Appl. No.: 17/714,151

(22) Filed: Apr. 6, 2022

(65) Prior Publication Data
US 2023/0138618 A1 May 4, 2023

(30) Foreign Application Priority Data
Oct. 29, 2021 (JP) ................................ 2021-178327

(51) Int. Cl.
G06F 3/12 (2006.01)
H04N 1/00 (2006.01)

(52) U.S. Cl.
CPC ............ *G06F 3/121* (2013.01); *G06F 3/1204* (2013.01); *G06F 3/1229* (2013.01); *G06F 3/1292* (2013.01); *H04N 1/00068* (2013.01); *H04N 1/00079* (2013.01)

(58) Field of Classification Search
None
See application file for complete search history.

(56) References Cited

U.S. PATENT DOCUMENTS

2001/0016122 A1* 8/2001 Arima .................. B41J 2/17566
399/24
2018/0349835 A1 12/2018 Ishida

FOREIGN PATENT DOCUMENTS

| JP | 2004178175 | | 6/2004 |
|---|---|---|---|
| JP | 2004178175 A | * | 6/2004 |
| JP | 2018190377 | | 11/2018 |
| JP | 2018205792 | | 12/2018 |
| JP | 2019043047 | | 3/2019 |

OTHER PUBLICATIONS

"Notice of Reasons for Refusal of Japan Counterpart Application", issued on Apr. 15, 2025, with English translation thereof, p. 1-p. 9.

* cited by examiner

*Primary Examiner* — Andrew H Lam
(74) *Attorney, Agent, or Firm* — JCIPRNET

(57) ABSTRACT

An information processing apparatus includes a processor configured to, in a case where a level of consumption of a consumable in the information processing apparatus meets a predetermined condition, provide a notification indicating that the level of consumption of the consumable meets the predetermined condition, and in a case where the information processing apparatus is connected to a mobile terminal via short-range wireless communication in a state in which the notification is being provided, notify the mobile terminal that the level of consumption of the consumable meets the predetermined condition and output consumable information, which indicates a prompt order for the consumable, to the mobile terminal.

20 Claims, 12 Drawing Sheets

FIG. 8

```
IT IS TIME TO REPLACE THE FOLLOWING          ~36B
CONSUMABLE.
WOULD YOU LIKE TO PLACE AN ORDER?

SERIAL NUMBER        : xxxxx
    STATUS ID            : yyyyy
    TARGET CONSUMABLE    : zzzzz

[ YES ]              [ NO ]
```

FIG. 9

| IDENTIFIER | CONTENTS | LENGTH | DESCRIPTION |
|---|---|---|---|
| a | Data [A] | A | HEADER |
| b | Data [B] | B | APPLICATION TYPE |
| c | Data [C] | C | Data Length |
| d | Data [D] | D | APPLICATION NAME |
| e | Data [E] | E | Version |
| f | Data [F] | F | SSID |
| g | Data [G] | G | WiFi Passphase |
| h | Data [H] | H | IP Address |

| IDENTIFIER | CONTENTS | LENGTH | DESCRIPTION |
|---|---|---|---|
| a | Data [A] | A | HEADER |
| b | Data [B] | B | MC_Serial No |
| c | Data [C] | C | isMaintenance |
| d | Data [D] | D | mtnTable [0] |
| e | Data [E] | E | mtnTable [1] |
| f | Data [F] | F | mtnTable [2] |
| g | Data [G] | G | mtnTable [3] |
| h | Data [H] | H | mtnTable [4] |
| i | Data [I] | I | APPLICATION TYPE |
| j | Data [J] | J | Data Length |
| k | Data [K] | K | APPLICATION NAME |
| l | Data [L] | L | Version |
| m | Data [M] | M | SSID |
| n | Data [N] | N | WiFi Passphase |
| o | Data [O] | O | IP Address |

FIG. 17

| IDENTIFIER | CONTENTS | LENGTH | DESCRIPTION |
|---|---|---|---|
| a | Data [A] | A | HEADER |
| b | Data [B] | B | CONNECTION CODE |
| c | Data [C] | C | isMaintenance |
| d | Data [D] | D | APPLICATION TYPE |
| e | Data [E] | E | Data Length |
| f | Data [F] | F | APPLICATION NAME |
| g | Data [G] | G | Version |
| h | Data [H] | H | SSID |
| i | Data [I] | I | WiFi Passphase |
| j | Data [J] | J | IP Address |

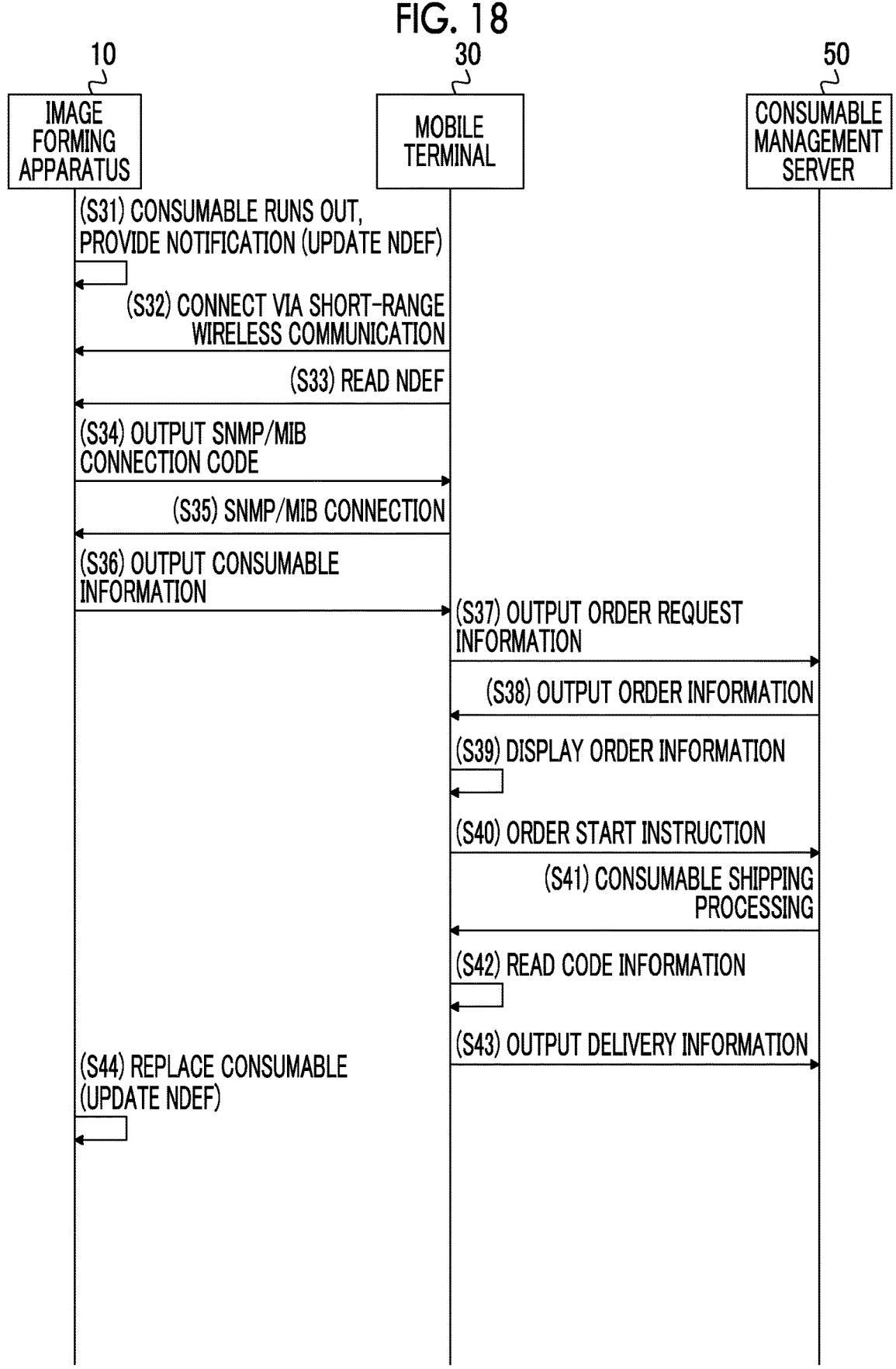

APPARATUS, SYSTEM, MOBILE TERMINAL, NON-TRANSITORY COMPUTER READABLE MEDIUM, AND METHOD FOR MANAGING CONSUMABLES USED IN IMAGE FORMING APPARATUS

CROSS-REFERENCE TO RELATED APPLICATIONS

This application is based on and claims priority under 35 USC 119 from Japanese Patent Application No. 2021-178327 filed Oct. 29, 2021.

BACKGROUND

(i) Technical Field

The present invention relates to an information processing apparatus, a consumable management system, a mobile terminal, a non-transitory computer readable medium storing an information processing program, and an information processing method.

(ii) Related Art

For example, JP2004-178175A describes a system in which an electronic device having a communication section is included, a computer having a communication section capable of performing data communication between electronic devices and a network access section capable of accessing a network or the like is included, and data communication is able to be performed between hosts having a consumable order system via a public network such as the Internet. The computer is provided with a consumable information storage section for storing in advance consumable information having at least identification information for a predetermined consumable used in the electronic device, the electronic device is provided with a consumption level detection section for detecting a level of consumption of the predetermined consumable, and in a case where the level of consumption of the consumable, which is detected by the consumption level detection section, reaches a predetermined level that is a target for replacement of consumables, the computer is notified of the fact via the communication section used between the computers. The computer reads the consumable information stored in the consumable information storage section based on the detection result of the consumption level detection section received by the communication section and transmits the consumable information to the host via a public network such as the Internet. The host executes an order for a consumable based on the received consumable information.

SUMMARY

There is a system for managing consumables used in a printer that is installed in a business establishment. In this system, the printer detects a level of consumption of a consumable, and in a case where the printer determines that replacement of the consumable is needed as a result of the detection, a computer is notified of the fact. The computer reads the consumable information in response to this notification and transmits the read consumable information to a host of a service center, and the host executes an order for the consumable according to the received consumable information.

In this case, the host needs to be constantly connected to the printer via the computer, constantly monitor the printer, and order the consumable as needed. On the other hand, for example, in a case where a printer is installed in a work place for remote work such as a home or a shared office, the printer is often not connected to a network environment. Providing a computer and a host that are constantly connected to this type of printer is more costly to monitor than providing a computer and a host that does not need to be constantly connected to this type of printer.

Aspects of non-limiting embodiments of the present disclosure relate to an information processing apparatus, a consumable management system, a mobile terminal, and a non-transitory computer readable medium storing an information processing program, and an information processing method that are capable of ordering consumables even in an environment where the information processing apparatus is not constantly connected to the system that manages the consumables.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to, in a case where a level of consumption of a consumable in the information processing apparatus meets a predetermined condition, provide a notification indicating that the level of consumption of the consumable meets the predetermined condition, and in a case where the information processing apparatus is connected to a mobile terminal via short-range wireless communication in a state in which the notification is being provided, notify the mobile terminal that the level of consumption of the consumable meets the predetermined condition and output consumable information, which indicates a prompt order for the consumable, to the mobile terminal.

BRIEF DESCRIPTION OF THE DRAWINGS

Exemplary embodiment(s) of the present invention will be described in detail based on the following figures, wherein:

FIG. 8 is a front view showing an example of a consumable information display screen according to the exemplary embodiment;

FIG. 9 is a diagram showing an NDEF record according to a comparative example;

FIG. 17 is a diagram showing an example of an NDEF record according to a second exemplary embodiment; and FIG. 18 is a sequence diagram showing an example of consumable order processing performed by the consumable management system according to the second exemplary embodiment.

DETAILED DESCRIPTION

Figure 1:
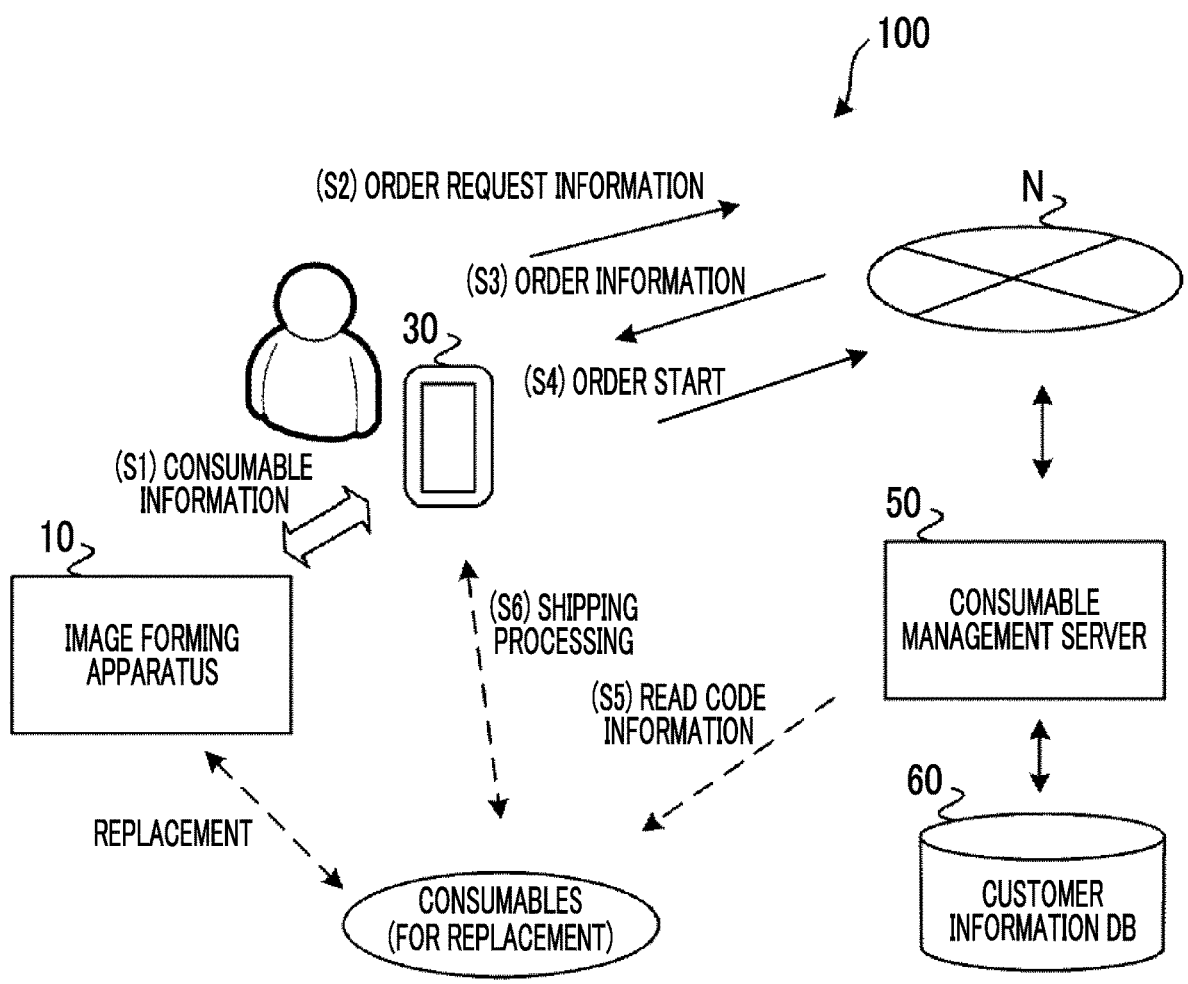
FIG. 1 is a diagram showing an example of a configuration of a consumable management system according to a first exemplary embodiment.

Hereinafter, exemplary embodiments for carrying out the technique of the present disclosure will be described in detail with reference to the drawings. In addition, components and processing in which operations, actions, and functions have the identical working may be given the same reference numerals throughout the drawings, and duplicate descriptions may be appropriately omitted. The respective drawings are merely schematically shown to the extent that the technique of the present disclosure is sufficiently understood. Therefore, the technique of the present disclosure is not limited to only the shown examples. Further, in the present exemplary embodiment, the description may be omitted for configurations which are not directly related to the present invention or well-known configurations.

First Exemplary Embodiment

FIG. 1 is a diagram showing an example of a configuration of a consumable management system 100 according to a first exemplary embodiment.

As shown in FIG. 1, the consumable management system 100 according to the present exemplary embodiment includes an image forming apparatus 10, a mobile terminal 30, a consumable management server 50, and a customer information database (DB) 60. The image forming apparatus 10 is an example of an information processing apparatus. The information processing apparatus is not limited to the image forming apparatus 10, but is intended for all electronic devices having consumables.

The mobile terminal 30 is capable of being connected to the image forming apparatus 10 via short-range wireless communication and being connected to the consumable management server 50 via a network N. For example, a smartphone, a tablet terminal, or the like is used for the mobile terminal 30. For example, near field communication (NFC), Bluetooth (registered trademark), or the like is used for the short-range wireless communication. NFC is a short-range wireless communication technique of using a frequency of 13.56 MHz and having a communication distance of substantially 10 cm. Further, for example, the Internet, a local area network (LAN), a wide area network (WAN), or the like is used for the network N.

The image forming apparatus 10 is installed in, for example, a user's home, a work place for remote work such as a shared office, and is not constantly connected to the consumable management server 50 via the network N. Therefore, in the present exemplary embodiment, placing an order for a consumable of the image forming apparatus 10 may be easily performed by using the mobile terminal 30 that is used by a user. Examples of consumable of the image forming apparatus 10 include a toner cartridge (toner bottle), a waste toner box, a photoconductor drum, a paper, and the like.

The consumable management server 50 is made accessible to the customer information DB 60 and performs order management for the consumables of the image forming apparatus 10. The customer information DB 60 may be provided separately from the consumable management server 50 or may be provided integrally with the consumable management server 50. The consumable management server 50 and the customer information DB 60 are managed by, for example, a manufacturer, an agent, or the like of the image forming apparatus 10. The customer information DB 60 includes, as customer information for each customer, serial information for uniquely identifying the image forming apparatus 10 (for example, a serial number or the like), model information of the image forming apparatus 10 (for example, a model name, a product type number, or the like), shipping destination information of the image forming apparatus 10 (for example, an address, a name, or the like), part information of the consumables (for example, a consumable name, a part type number, or the like), and shipping destination information of the consumables (default is the same as the shipping destination of the image forming apparatus 10).

In FIG. 1 (S1), in a case where a level of consumption of a consumable meets a predetermined condition, the image forming apparatus 10 notifies the mobile terminal 30, which is connected to the image forming apparatus 10 via the short-range wireless communication, that the level of consumption of the consumable meets the predetermined condition and outputs consumable information indicating a prompt order for the consumable to the mobile terminal 30.

In (S2), the mobile terminal 30 outputs order request information of the consumable to the consumable management server 50 according to the consumable information from the image forming apparatus 10.

In (S3), in a case where the consumable management server 50 receives the order request information from the mobile terminal 30, the consumable management server 50 accesses the customer information DB 60, acquires a shipping destination and a consumable name of the consumable, and outputs order information, which includes the shipping destination, the consumable name, and the number of consumables of the consumable, to the mobile terminal 30.

In (S4), the mobile terminal 30 outputs an order start instruction of the consumable to the consumable management server 50 according to the order information from the consumable management server 50.

In (S5), in a case where the consumable management server 50 receives the order start instruction from the mobile terminal 30, the consumable management server 50 performs processing of shipping the corresponding consumable to a place designated as the shipping destination of the consumable.

In (S6), the mobile terminal 30 reads code information assigned to the consumable delivered to the designated place and outputs delivery information obtained from the read code information to the consumable management server 50. In this way, delivery processing of the consumable is completed. Further, the user performs an operation of replacing the consumable delivered for the image forming apparatus 10. The specific processing contents of the above (S1) to (S6) will be described later.

Figure 2:
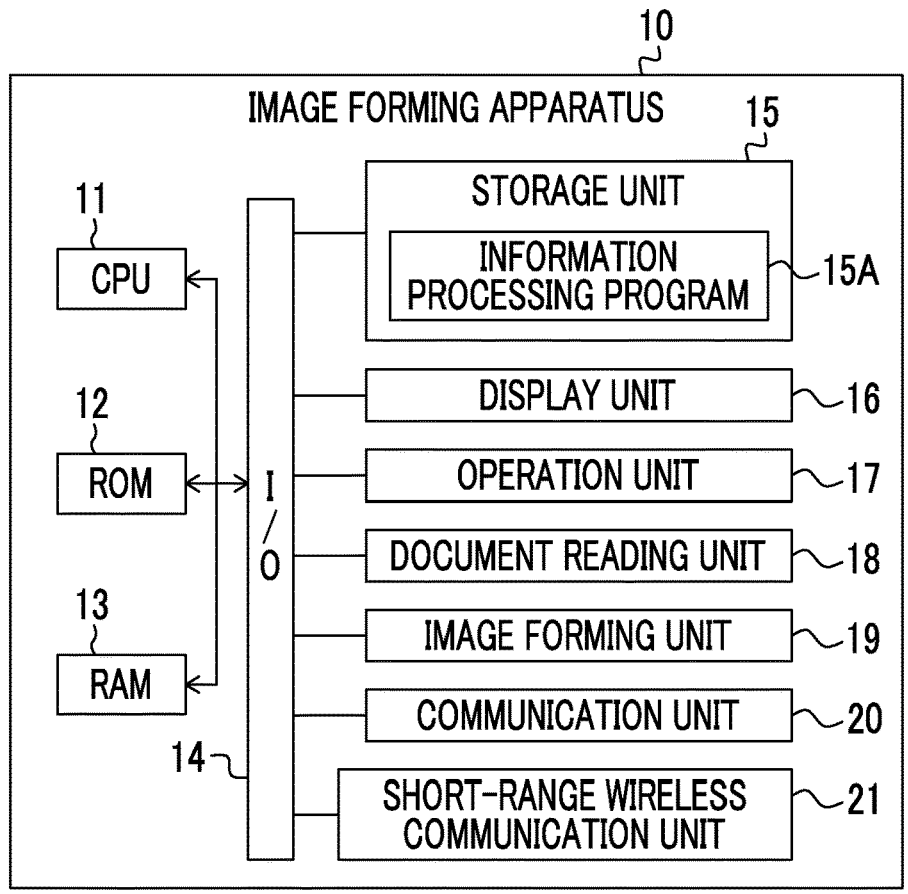
FIG. 2 is a block diagram showing an example of an electrical configuration of an image forming apparatus according to the first exemplary embodiment.

FIG. 2 is a block diagram showing an example of an electrical configuration of the image forming apparatus 10 according to the first exemplary embodiment.

As shown in FIG. 2, the image forming apparatus 10 according to the present exemplary embodiment includes a central processing unit (CPU) 11, a read only memory (ROM) 12, a random access memory (RAM) 13, an input and output interface (I/O) 14, a storage unit 15, a display unit 16, an operation unit 17, a document reading unit 18, an image forming unit 19, a communication unit 20, and a short-range wireless communication unit 21.

Each of the CPU 11, the ROM 12, the RAM 13, and the I/O 14 is connected via a bus. Functional units including the storage unit 15, the display unit 16, the operation unit 17, the document reading unit 18, the image forming unit 19, the communication unit 20, and the short-range wireless communication unit 21 are connected to the I/O 14. Each of the functional units are capable of communicating with the CPU 11 via the I/O 14.

A control unit is configured with the CPU 11, the ROM 12, the RAM 13, and the I/O 14. The control unit may be configured as a sub-control unit that controls an operation of a part of the image forming apparatus 10 or may be configured as a part of a main control unit that controls the entire operation of the image forming apparatus 10. For example, an integrated circuit such as a large scale integration (LSI) or an integrated circuit (IC) chipset is used for a part or all of each block of the control unit. An individual circuit may be used for each of the above blocks, or a circuit in which a part or all of the blocks are integrated may be used. Each of the above blocks may be integrally provided, or some blocks may be separately provided. In addition, a part of the respective blocks may be separately provided. A dedicated circuit or a general-purpose processor, not limited to the LSI, may be used for the integration of the control unit.

As the storage unit 15, for example, a hard disk drive (HDD), a solid state drive (SSD), a flash memory, or the like is used. An information processing program 15A according to the present exemplary embodiment is stored in the storage unit 15. In addition, the information processing program 15A may be stored in the ROM 12.

The information processing program 15A may be installed in advance in the image forming apparatus 10, for example. The information processing program 15A may be realized in a manner that the information processing program 15A is stored in a non-volatile storage medium or distributed via the network N, and is appropriately installed in the image forming apparatus 10. In addition, as an example of the non-volatile storage medium, a compact disc read only memory (CD-ROM), a magneto-optical disk, an HDD, a digital versatile disc read only memory (DVD-ROM), a flash memory, a memory card, or the like is conceivable.

For example, a liquid crystal display (LCD), an organic electro luminescence (EL) display, or the like is used for the display unit 16. The display unit 16 may integrally include a touch panel. Various operation keys such as a numeric keypad and a start key are provided in the operation unit 17, for example. The display unit 16 and the operation unit 17 receive instructions related to various image processing functions and settings from the user of the image forming apparatus 10 as an operation panel. These various instructions include, for example, an instruction to start reading a document, an instruction to start copying a document, a print instruction of print data stored in the image forming apparatus 10, and the like. The display unit 16 displays various types of information such as the result of processing executed in accordance with the instruction received from the user and the notification in response to the processing.

Figure 3:
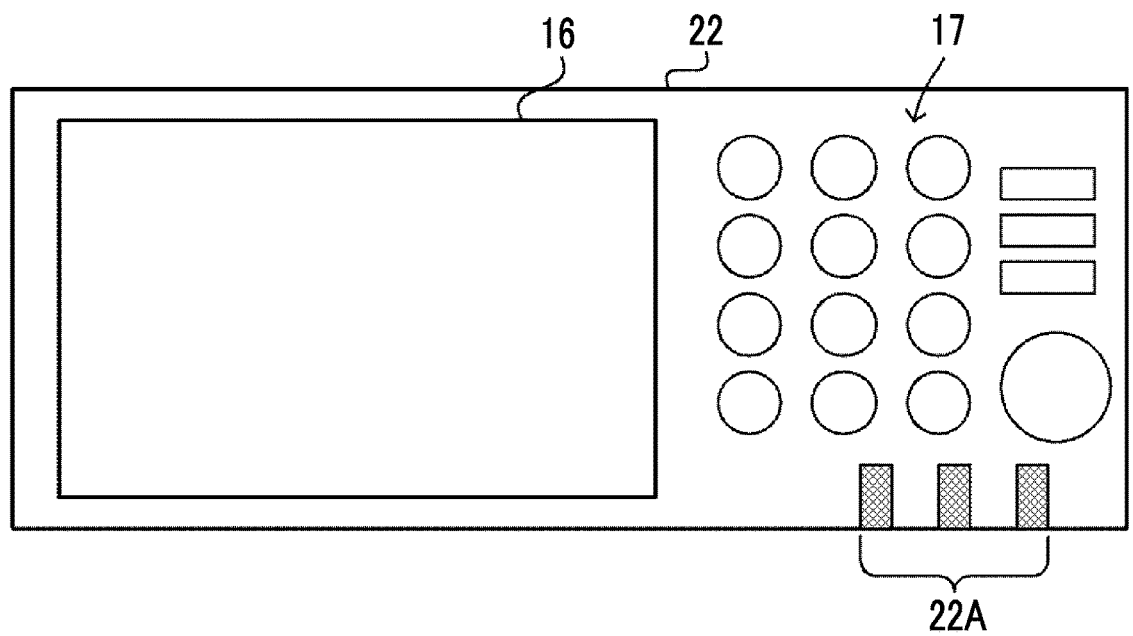
FIG. 3 is a front view showing an example of an operation panel according to an exemplary embodiment.

FIG. 3 is a front view showing an example of an operation panel 22 according to the present exemplary embodiment. As shown in FIG. 3, the operation panel 22 includes the display unit 16, the operation unit 17, and a light emitting diode (LED) indicator 22A. The LED indicator 22A notifies the user of various states of the image forming apparatus 10 by lighting, blinking, or the like of LEDs having one or more colors.

The document reading unit 18 takes documents placed on a paper feed tray of an automatic document feeder (not shown) provided on the upper portion of the image forming apparatus 10 one by one and optically reads the taken document to obtain image information. Alternatively, the document reading unit 18 optically reads a document placed on a document stand such as platen glass to obtain image information.

The image forming unit 19 forms an image, which is acquired based on the image information obtained by reading by the document reading unit 18 and the image information obtained by a printing instruction by an external device, on a paper which is an example of a recording medium. In the following, an electrophotographic method will be described as an example of a method of forming an image, but another method such as an ink jet method may be adopted.

In a case where the method of forming an image is the electrophotographic method, the image forming unit 19 includes a photoconductor drum, a charging device, an exposure device, a developing device, a transfer device, and a fixing device. The charging device applies a voltage to the photoconductor drum to charge the surface of the photoconductor drum. The exposure device exposes the photoconductor drum charged by the charging device with light corresponding to the image information, so as to form an electrostatic latent image on the photoconductor drum. The developing device develops the electrostatic latent image formed on the photoconductor drum with a toner to form a toner image on the photoconductor drum. The transfer device transfers the toner image formed on the photoconductor drum to the paper. The fixing device fixes the toner image transferred to the paper by heating and pressurizing.

The communication unit 20 is a communication interface for connecting the image forming apparatus 10 to the network N such as the Internet, LAN, and WAN, and is capable of communicating with an external device via the network N. However, in the present exemplary embodiment, the image forming apparatus 10 and the consumable management server 50 are not constantly connected to each other via the network N.

The short-range wireless communication unit 21 performs short-range wireless communication with the mobile terminal 30. As described above, for example, NFC, Bluetooth (registered trademark), or the like is used for the short-range wireless communication unit 21.

Figure 4:
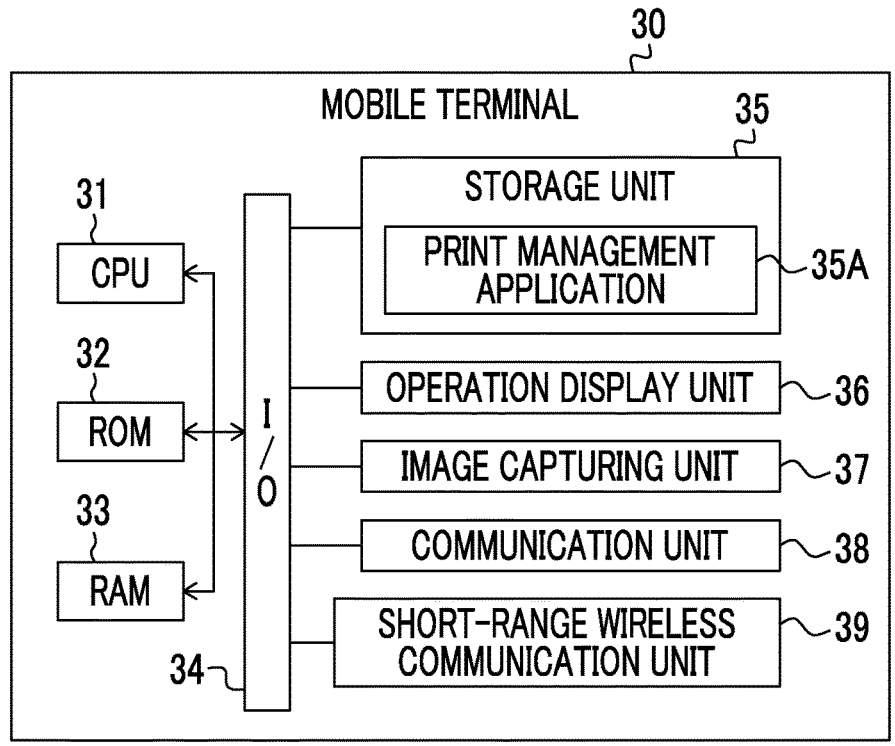
FIG. 4 is a block diagram showing an example of an electrical configuration of a mobile terminal according to the first exemplary embodiment.

FIG. 4 is a block diagram showing an example of an electrical configuration of the mobile terminal 30 according to the first exemplary embodiment.

As shown in FIG. 4, the mobile terminal 30 according to the present exemplary embodiment includes a CPU 31, a ROM 32, a RAM 33, an I/O 34, a storage unit 35, an operation display unit 36, an image capturing unit 37, a communication unit 38, and a short-range wireless communication unit 39.

Each of the CPU 31, the ROM 32, the RAM 33, and the I/O 34 is connected via a bus. Each functional unit including the storage unit 35, the operation display unit 36, the image capturing unit 37, the communication unit 38, and the short-range wireless communication unit 39 is connected to the I/O 34. Each of the functional units are capable of communicating with the CPU 31 via the I/O 34.

A control unit is configured with the CPU 31, the ROM 32, the RAM 33, and the I/O 34. The control unit may be configured as a sub-control unit that controls an operation of a part of the mobile terminal 30 or may be configured as a part of a main control unit that controls the entire operation of the mobile terminal 30.

As the storage unit 35, for example, a flash memory or the like is used. The storage unit 35 stores a print management application/program (hereinafter, referred to as a "print management application") 35A for printing or the like via the short-range wireless communication. The print management application 35A may be stored in the ROM 32.

The print management application 35A may be installed in advance in the mobile terminal 30, for example. The print management application 35A may be realized in a manner that the print management application 35A is stored in a non-volatile storage medium or distributed via the network N, and is appropriately installed in the mobile terminal 30. As an example of the non-volatile storage medium, a CD-ROM, a magneto-optical disk, an HDD, a DVD-ROM, a flash memory, a memory card, or the like is assumed.

For example, a liquid crystal display (LCD), an organic EL display, or the like is used in the operation display unit 36, and the operation display unit 36 integrally has a touch panel for receiving an operation input from the user.

The image capturing unit 37 is a camera that images a target, and for example, images the code information assigned to the consumable.

The communication unit 38 is a communication interface for connecting the mobile terminal 30 to the network N such as the Internet, LAN, and WAN, and is capable of communicating with the consumable management server 50 via the network N.

The short-range wireless communication unit 39 performs short-range wireless communication with the image forming apparatus 10. As described above, for example, NFC, Bluetooth (registered trademark), or the like is used for the short-range wireless communication unit 39.

By executing the print management application 35A, the mobile terminal 30 according to the present exemplary embodiment can cause the image forming apparatus 10 to execute printing or the like via short-range wireless communication. Further, by executing the print management application 35A, the consumable information can be acquired from the image forming apparatus 10 via the short-range wireless communication. Further, by executing the print management application 35A, transmission and reception of various information, which is related to ordering for consumables, can be performed with the consumable management server 50 via the network N.

Figure 5:
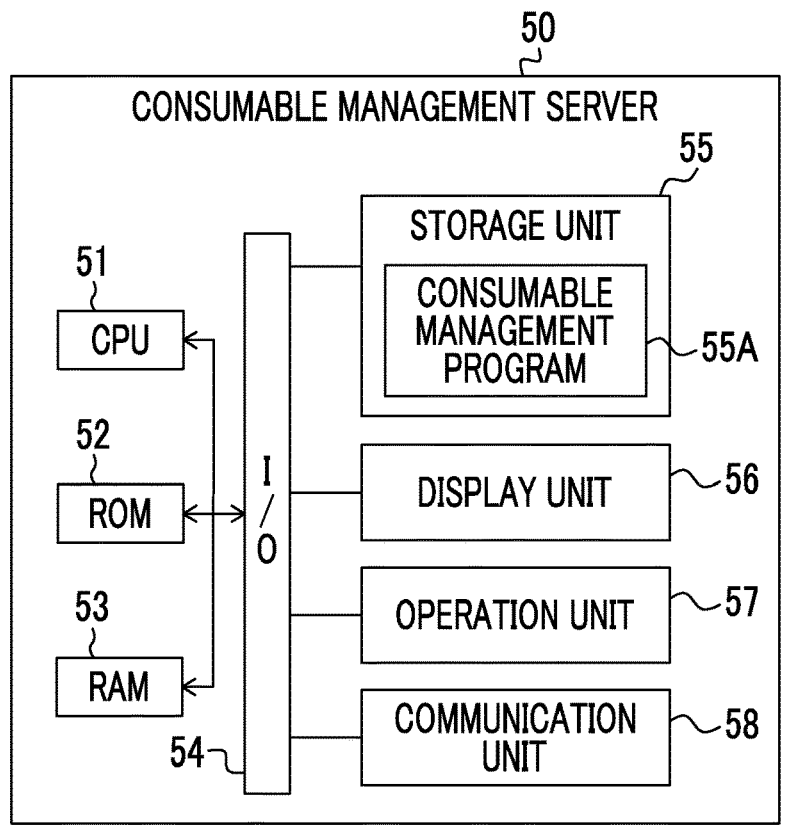
FIG. 5 is a block diagram showing an example of an electrical configuration of a consumable management server according to the first exemplary embodiment.

FIG. 5 is a block diagram showing an example of an electrical configuration of the consumable management server 50 according to the first exemplary embodiment.

As shown in FIG. 5, the consumable management server 50 according to the present exemplary embodiment includes a CPU 51, a ROM 52, a RAM 53, an I/O 54, a storage unit 55, a display unit 56, an operation unit 57, and a communication unit 58.

Each of the CPU 51, the ROM 52, the RAM 53, and the I/O 54 is connected via a bus. Functional units including the storage unit 55, the display unit 56, the operation unit 57, and the communication unit 58 are connected to the I/O 54. Each of the functional units are capable of communicating with the CPU 51 via the I/O 54.

A control unit is configured with the CPU 51, the ROM 52, the RAM 53, and the I/O 54. The control unit may be configured as a sub-control unit that controls an operation of a part of the consumable management server 50 or may be configured as a part of a main control unit that controls the entire operation of the consumable management server 50.

As the storage unit 55, for example, an HDD, an SSD, a flash memory or the like is used. A consumable management program 55A according to the present exemplary embodiment is stored in the storage unit 55. In addition, the consumable management program 55A may be stored in the ROM 52.

The consumable management program 55A may be installed in advance in the consumable management server 50, for example. The consumable management program 55A may be realized in a manner that the consumable management program 55A is stored in a non-volatile storage medium or distributed via the network N, and is appropriately installed in the consumable management server 50. As an example of the non-volatile storage medium, a CD-ROM, a magneto-optical disk, an HDD, a DVD-ROM, a flash memory, a memory card, or the like is assumed.

For the display unit 56, for example, a liquid crystal display (LCD), an organic EL display or the like is used. The operation unit 57 is provided with an input device such as a keyboard and a mouse.

The communication unit 58 is capable of being connected to a network N such as the Internet, LAN, and WAN, and communicating with the mobile terminal 30 via the network N.

By executing the consumable management program 55A, the consumable management server 50 according to the present exemplary embodiment can perform transmission and reception of various information, which is related to ordering for consumables, with the mobile terminal 30 via the network N.

By the way, as described above, for example, in a case where the image forming apparatus 10 is installed in a work place for remote work such as a home or a shared office, the image forming apparatus 10 is often not connected to a network environment. Providing a computer and a host that are constantly connected to this type of image forming apparatus 10 is more costly to monitor than providing a computer and a host that does not need to be constantly connected to this type of image forming apparatus 10.

Therefore, in a case where a level of consumption of a consumable in the image forming apparatus 10 meets a predetermined condition, the image forming apparatus 10 according to the present exemplary embodiment provides a notification indicating that the level of consumption of the consumable meets the predetermined condition. In a case where the image forming apparatus 10 is connected to the mobile terminal 30 via the short-range wireless communication in a state in which the notification is being provided, the image forming apparatus 10 notifies the mobile terminal 30 that the level of consumption of the consumable meets the predetermined condition and outputs the consumable information indicating a prompt order for the consumable to the mobile terminal 30.

Figure 6:
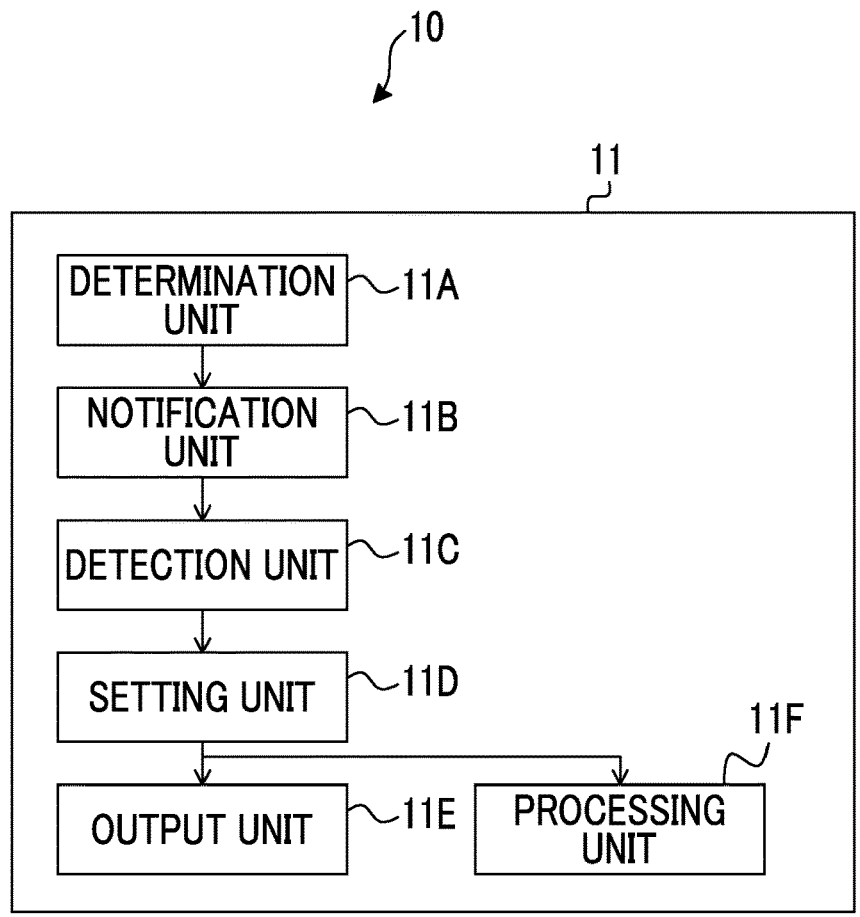
FIG. 6 is a block diagram showing an example of a functional configuration of the image forming apparatus according to the first exemplary embodiment.

Specifically, the CPU 11 in the image forming apparatus 10 according to the present exemplary embodiment writes the information processing program 15A stored in the storage unit 15 into the RAM 13 and executes the information processing program 15A to function as each unit shown in FIG. 6. In addition, the CPU 11 is an example of a processor.

FIG. 6 is a block diagram showing an example of a functional configuration of the image forming apparatus 10 according to the first exemplary embodiment.

As shown in FIG. 6, the CPU 11 in the image forming apparatus 10 according to the present exemplary embodiment functions as a determination unit 11A, a notification unit 11B, a detection unit 11C, a setting unit 11D, an output unit 11E, and a processing unit 11F.

The determination unit 11A determines whether or not the level of consumption of the consumable in the image forming apparatus 10 meets the predetermined condition. Examples of the predetermined condition include a case where the remaining amount of consumables is equal to or less than a threshold value, a case where the time for replacing consumables has arrived, and the like.

In a case where the determination unit 11A determines that a level of consumption of a consumable meets the predetermined condition, the notification unit 11B provides a notification indicating that the level of consumption of the consumable meets the predetermined condition. Examples of the notification include various forms such as displaying a message prompting the replenishment or replacement of the consumables on the touch panel of the display unit 16, blinking the LED indicator 22A on the operation panel 22, and transmitting a message prompting the replenishment or replacement of the consumables via an e-mail.

The detection unit 11C monitors a connection state of the short-range wireless communication unit 21 and detects that the image forming apparatus 10 is connected to the mobile terminal 30 via the short-range wireless communication.

In a case where the detection unit 11C detects that the image forming apparatus 10 is connected to the mobile terminal 30 via the short-range wireless communication in a state in which the above notification is being provided, the setting unit 11D sets a consumable information output mode in which the consumable information is output. Further, in a case where the detection unit 11C detects that the image forming apparatus 10 is connected to the mobile terminal 30 via the short-range wireless communication in a state in which the above notification is not being provided, the setting unit 11D sets a processing execution mode in which predetermined processing (for example, printing or the like) is executed with the mobile terminal 30.

Further, in a case where the image forming apparatus 10 is connected to the mobile terminal 30 via the short-range wireless communication in a state in which the above notification is being provided, the setting unit 11D may enable switching between the processing execution mode and the consumable information output mode.

Figure 7:
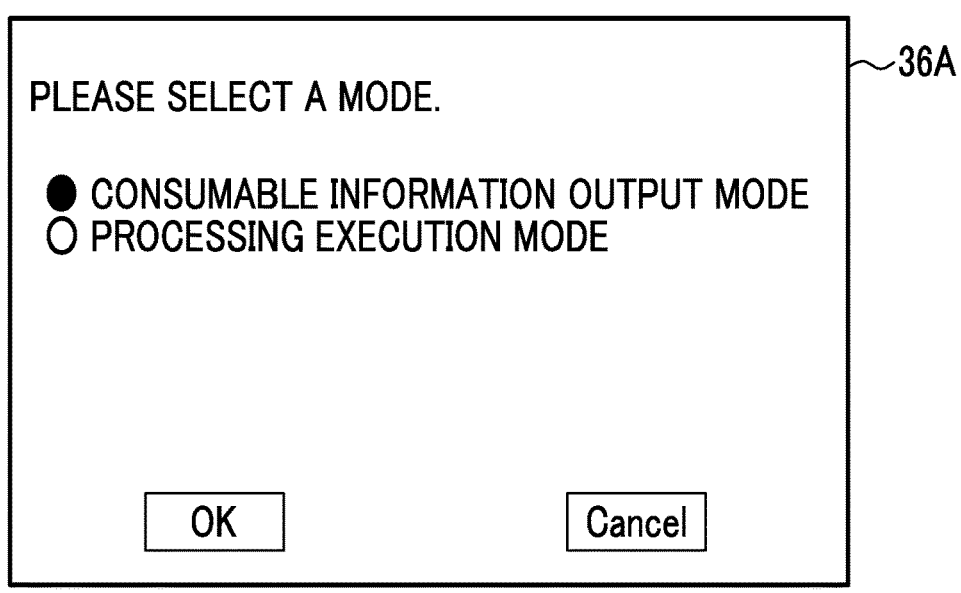
FIG. 7 is a front view showing an example of a mode selection screen according to the exemplary embodiment.

FIG. 7 is a front view showing an example of a mode selection screen 36A according to the present exemplary embodiment.

The mode selection screen 36A shown in FIG. 7 is displayed on the operation display unit 36 of the mobile terminal 30. In a case where the image forming apparatus 10 is connected to the mobile terminal 30 via the short-range wireless communication in a state in which the above notification is being provided, the setting unit 11D displays the mode selection screen 36A shown in FIG. 7 on the mobile terminal 30 and enables switching between the processing execution mode and the consumable information output mode in response to the user's selection.

Further, in a case where a level of consumption of a consumable meets the predetermined condition, the setting unit 11D may enable a default setting regarding whether to perform switching to the processing execution mode or the consumable information output mode. That is, in a case where the consumables have run out, the default set mode is selected and executed.

In a case where the consumable information output mode is set by the setting unit 11D, the output unit 11E notifies the mobile terminal 30 that the level of consumption of the consumable meets the predetermined condition and outputs the consumable information indicating a prompt order for the consumable to the mobile terminal 30.

FIG. 8 is a front view showing an example of a consumable information display screen 36B according to the present exemplary embodiment.

The consumable information display screen 36B shown in FIG. 8 is displayed on the operation display unit 36 of the mobile terminal 30. As shown in FIG. 8, the consumable information includes a serial number, which is an example of serial information for uniquely identifying the image forming apparatus 10, and a status identification (ID), which is an example of status information indicating that replacement or replenishment of the consumable is needed. The target consumable is capable of being specified by the status ID. These serial number and status ID are acquired from, for example, a data record (hereinafter, referred to as a "NDEF record") having a near field communication data exchange format (NDEF), which is a data format used for reading and writing data by NFC. The NDEF record is stored in, for example, the storage unit 15.

FIG. 9 is a diagram showing the NDEF record according to a comparative example. The NDEF record shown in FIG. 9 stores information such as a service set identifier (SSID) for WiFi (registered trademark) connection.

Header information is stored in Data[A], and an application type is stored in Data[B]. A data length is stored in Data[C], and an application name is stored in Data[D]. A version (version information) is stored in Data[E], and SSID is stored in Data[F]. A WiFi passphrase is stored in Data[G], and an IP address is stored in Data[H]. These pieces of information are information used in a case of performing normal short-range wireless communication and are updated as needed.

Figures 10, 11:
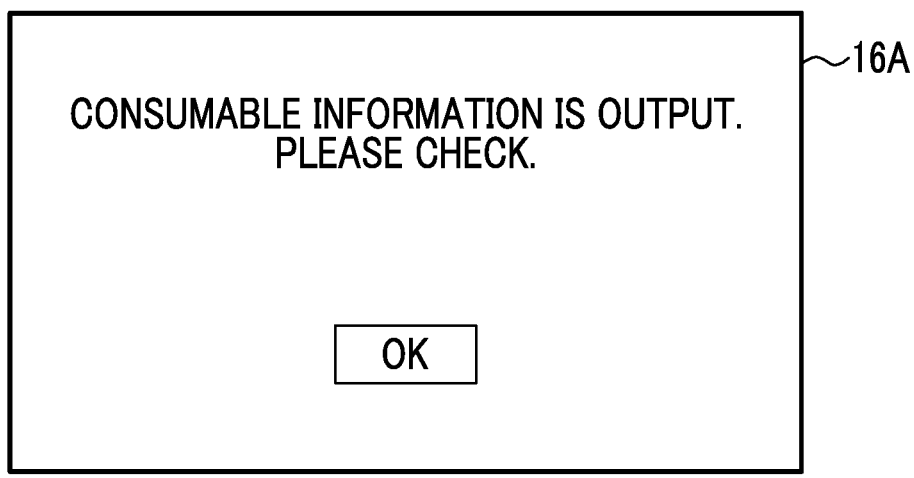
FIG. 10 is a diagram showing an example of an NDEF record according to the first exemplary embodiment.
FIG. 11 is a front view showing an example of a consumable information output completed notification screen according to the exemplary embodiment.

FIG. 10 is a diagram showing an example of the NDEF record according to the first exemplary embodiment. Data [B] to Data[H] are added to the NDEF record shown in FIG. 10 with respect to the comparative example shown in FIG. 9. A serial number of the image forming apparatus 10 is stored in Data[B], and a consumable replacement flag is stored in Data[C] (an "isMaintenance" field). The consumable replacement flag "1" is set in Data[C] in a case where replacement or replenishment of the consumable is needed, and the consumable replacement flag "0" is set in Data[C] in a case where replacement or replenishment of the consumable is not needed. By default, "0" is set. The status ID corresponding to the consumable replacement flag is stored in Data[D] to Data[H]. In a case where there are a plurality of consumables that need to be replaced or replenished, the status ID is stored for each consumable. The NDEF record shown in FIG. 10 is updated at the timing of replacement or replenishment of the consumables.

The mobile terminal 30 activates and executes the print management application 35A, and acquires the serial number and the status ID from the NDEF record shown in FIG. 10 as an example by connecting to the image forming apparatus 10, in which the above notification is being provided, via the short-range wireless communication.

Further, the notification unit 11B stops providing the above notification (for example, blinking of an LED indicator 22A or the like) after outputting the consumable information to the mobile terminal 30 by the output unit 11E. At this time, the notification unit 11B may perform control of displaying information, which indicates that the consumable information is output, on the display unit 16 of the image forming apparatus 10 after outputting the consumable information to the mobile terminal 30.

FIG. 11 is a front view showing an example of a consumable information output completed notification screen 16A according to the present exemplary embodiment.

The consumable information output completed notification screen 16A shown in FIG. 11 is displayed on the display unit 16 of the image forming apparatus 10. As shown in FIG. 11, a message indicating that the consumable information is output is displayed, and a user near the image forming apparatus 10 can be notified that the consumable information is output to the mobile terminal 30.

Further, after outputting the consumable information to the mobile terminal 30, in a case where the image forming apparatus 10 is connected to the mobile terminal 30 again via the short-range wireless communication, the output unit 11E does not output the consumable information again to the mobile terminal 30. This prevents consumables from being ordered in duplicate.

In a case where the processing execution mode is set by the setting unit 11D, the processing unit 11F executes predetermined processing (for example, printing or the like) with respect to the mobile terminal 30.

Next, an action of the image forming apparatus 10 according to the first exemplary embodiment will be described with reference to FIG. 12.

Figure 12:
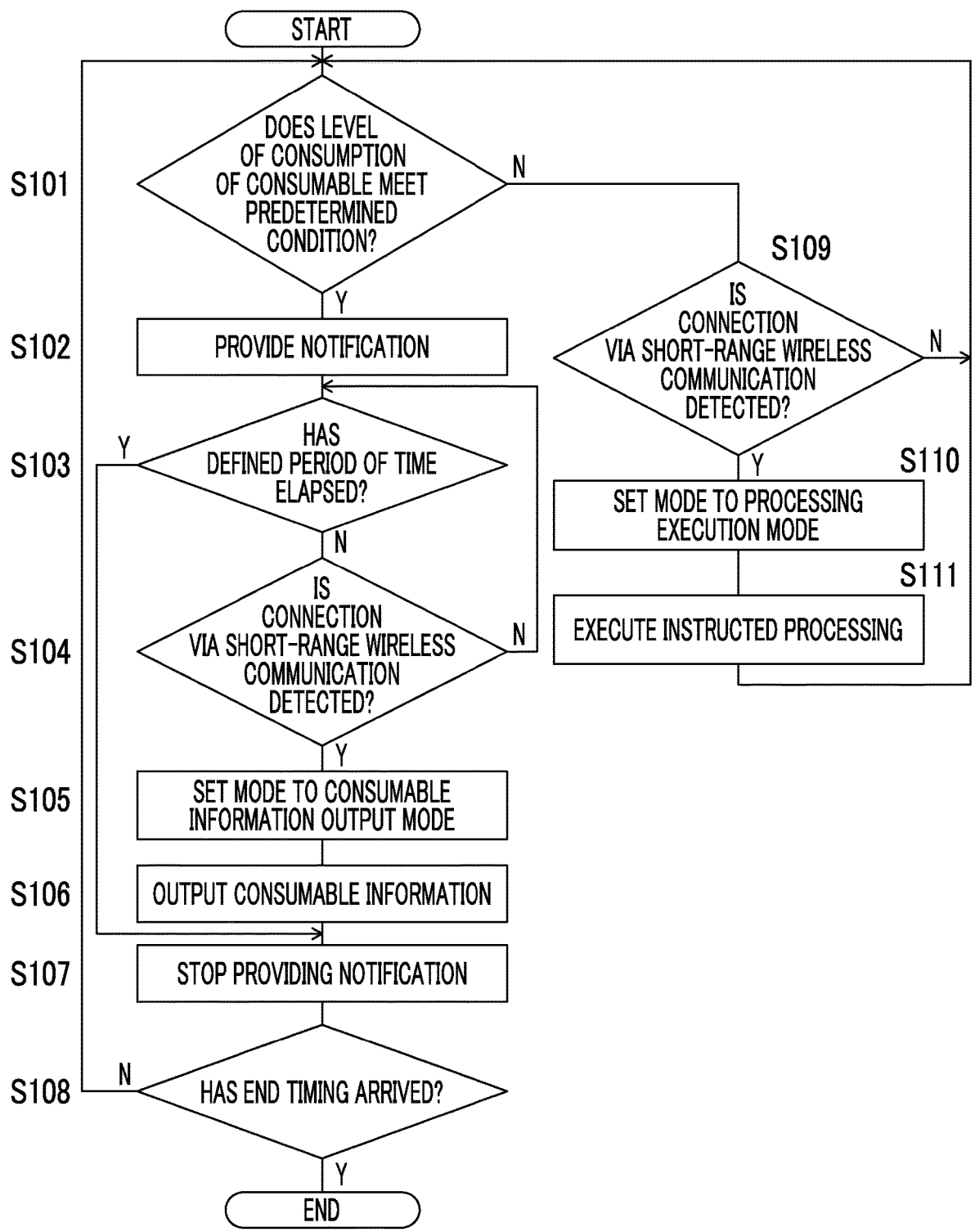
FIG. 12 is a flowchart showing an example of a flow of processing executed by an information processing program according to the first exemplary embodiment.

FIG. 12 is a flowchart showing an example of a flow of processing executed by the information processing program 15A according to the first exemplary embodiment.

First, in a case where the image forming apparatus 10 is instructed to execute a consumable management function, the CPU 11 activates the information processing program 15A to execute each of the following steps.

In step S101 of FIG. 12, the CPU 11 determines whether or not a level of consumption of a consumable meets a predetermined condition (for example, the remaining amount of the consumable is equal to or less than the threshold value, the time for replacing consumables has arrived, or the like). In a case where the CPU 11 determines that the level of consumption of the consumable meets the predetermined condition (in the case of an affirmative determination), the step proceeds to step S102, and in a case where the CPU 11 determines that the level of consumption of the consumable does not meet the predetermined condition (in the case of a negative determination), the step proceeds to step S109.

In step S102, the CPU 11 provides a notification (for example, displaying of a message, blinking of an LED indicator, or the like) indicating that the level of consumption of the consumable meets the predetermined condition. At this time, the CPU 11 updates the NDEF record shown in FIG. 10 described above, as an example. That is, in the NDEF record, the serial number of the image forming apparatus 10 is stored, the consumable replacement flag "1" is set, and the status ID of the consumable is stored.

In step S103, the CPU 11 determines whether or not a defined period of time has elapsed from the start of the notification. The defined period of time may be appropriately set in a range of, for example, 10 seconds or more and 60 seconds or less. In a case where the CPU 11 determines that the defined period of time has elapsed (in the case of an affirmative determination), the step proceeds to step S107, and in a case where the CPU 11 determines that the defined period of time has not elapsed (in the case of a negative determination), the step proceeds to step S104.

In step S104, the CPU 11 detects whether or not the image forming apparatus 10 is connected to the mobile terminal 30 via the short-range wireless communication. In a case where the CPU 11 detects that the image forming apparatus 10 is connected to the mobile terminal 30 via the short-range wireless communication (in a case of an affirmative determination), the step proceeds to step S105, and in a case where the CPU 11 does not detect that the image forming apparatus 10 is connected to the mobile terminal 30 via the short-range wireless communication (in a case of a negative determination), the step returns to step S103 and the CPU 11 repeats the processing.

In step S105, the CPU 11 sets the consumable information output mode.

In step S106, the CPU 11 outputs the consumable information to the mobile terminal 30. The consumable information includes, for example, the serial number and status ID obtained from the NDEF record shown in FIG. 10 described above. The output consumable information is displayed on the consumable information display screen 36B shown in FIG. 8 described above, as an example.

In step S107, the CPU 11 stops providing the notification (for example, displaying of a message, blinking of an LED indicator, or the like) started in step S102. At this time, the CPU 11 may perform control of displaying information, which indicates that the consumable information is output, on the display unit 16 of the image forming apparatus 10 after outputting the consumable information to the mobile terminal 30. The information, which indicates that the consumable information is output, is displayed on the consumable information output completed notification screen 16A shown in FIG. 11 described above, as an example.

In step S108, the CPU 11 determines whether or not an end timing has arrived. Examples of the end timing include a case where the main power of the image forming apparatus 10 is turned off, a case where the connection by the short-range wireless communication is disconnected, and the like. In a case where the CPU 11 determines that the end timing has not arrived (in a case of a negative determination), the step returns to step S101 and the CPU 11 repeats the processing, and in a case where the CPU 11 determines that the end timing has arrived (in a case of an affirmative determination), the CPU 11 ends a series of processing performed by the present information processing program 15A.

On the other hand, in step S109, the CPU 11 detects whether or not the image forming apparatus 10 is connected to the mobile terminal 30 via the short-range wireless communication. In a case where the CPU 11 detects that the image forming apparatus 10 is connected to the mobile terminal 30 via the short-range wireless communication (in a case of an affirmative determination), the step proceeds to step S110, and in a case where the CPU 11 does not detect that the image forming apparatus 10 is connected to the mobile terminal 30 via the short-range wireless communication (in a case of a negative determination), the step returns to step S101 and the CPU 11 repeats the processing.

In step S110, the CPU 11 sets the processing execution mode.

In step S111, the CPU 11 executes processing (for example, printing or the like) instructed by the mobile terminal 30, the step returns to step S101, and the CPU 11 repeats the processing.

Figure 13:
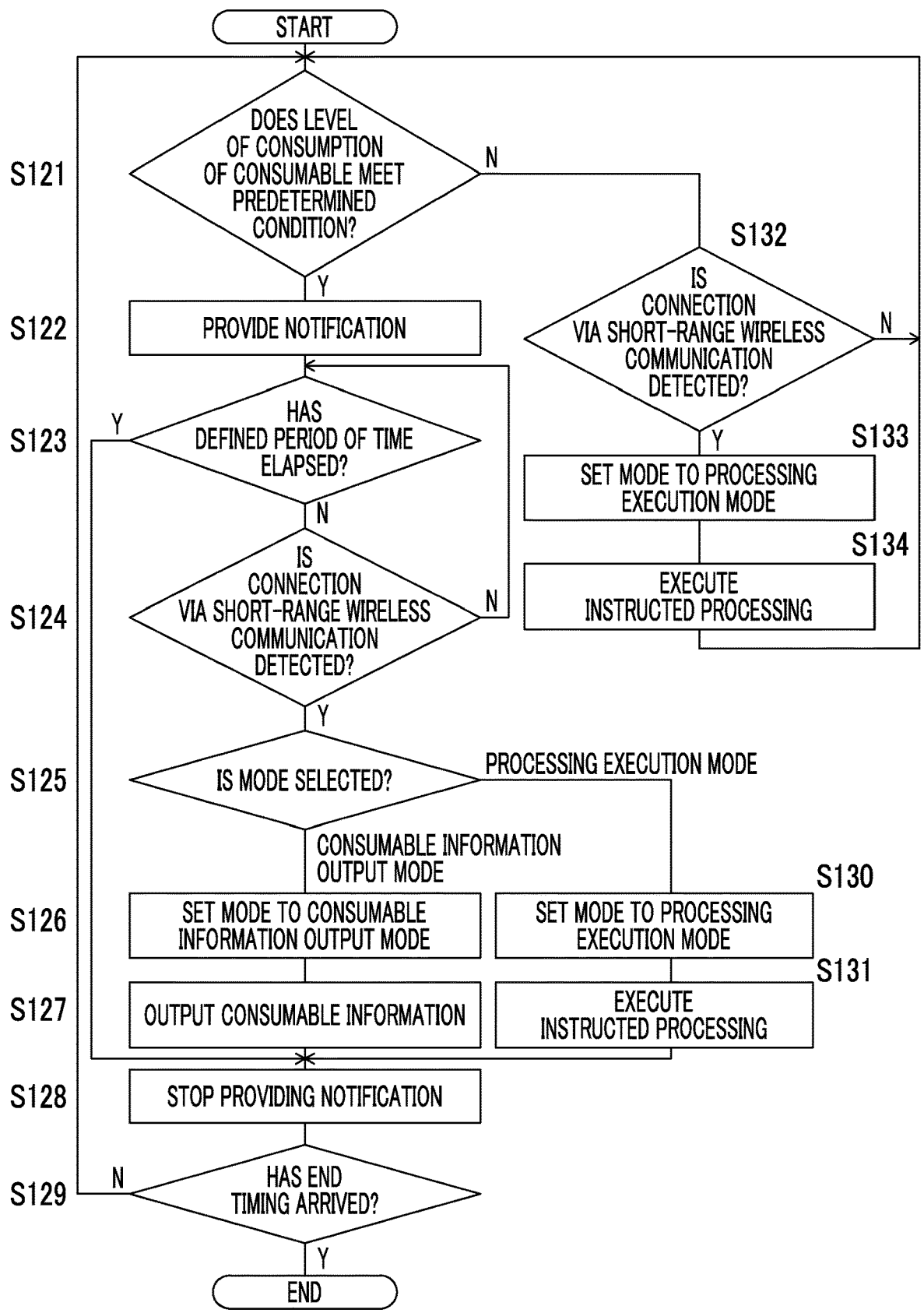
FIG. 13 is a flowchart showing another example of a flow of processing executed by the information processing program according to the first exemplary embodiment.

FIG. 13 is a flowchart showing another example of a flow of processing executed by the information processing program 15A according to the first exemplary embodiment. In the present example, processing of switching the mode between the consumable information output mode and the processing execution mode in response to the user's selection in a case where replacement or replenishment of the consumable is needed, will be described.

First, in a case where the image forming apparatus 10 is instructed to execute a consumable management function, the CPU 11 activates the information processing program 15A to execute each of the following steps.

In step S121 of FIG. 13, the CPU 11 determines whether or not a level of consumption of a consumable meets a predetermined condition (for example, the remaining amount of the consumable is equal to or less than the threshold value, the time for replacing consumables has arrived, or the like). In a case where the CPU 11 determines that the level of consumption of the consumable meets the predetermined condition (in the case of an affirmative determination), the step proceeds to step S122, and in a case where the CPU 11 determines that the level of consumption of the consumable does not meet the predetermined condition (in the case of a negative determination), the step proceeds to step S132.

In step S122, the CPU 11 provides a notification (for example, displaying of a message, blinking of an LED indicator, or the like) indicating that the level of consumption of the consumable meets the predetermined condition. At this time, the CPU 11 updates the NDEF record shown in FIG. 10 described above, as an example. That is, in the NDEF record, the serial number of the image forming apparatus 10 is stored, the consumable replacement flag "1" is set, and the status ID of the consumable is stored.

In step S123, the CPU 11 determines whether or not a defined period of time has elapsed from the start of the notification. The defined period of time may be appropriately set in a range of, for example, 10 seconds or more and 60 seconds or less. In a case where the CPU 11 determines that the defined period of time has elapsed (in the case of an affirmative determination), the step proceeds to step S127, and in a case where the CPU 11 determines that the defined period of time has not elapsed (in the case of a negative determination), the step proceeds to step S124.

In step S124, the CPU 11 detects whether or not the image forming apparatus 10 is connected to the mobile terminal 30 via the short-range wireless communication. In a case where the CPU 11 detects that the image forming apparatus 10 is connected to the mobile terminal 30 via the short-range wireless communication (in a case of an affirmative determination), the step proceeds to step S125, and in a case where the CPU 11 does not detect that the image forming apparatus 10 is connected to the mobile terminal 30 via the short-range wireless communication (in a case of a negative determination), the step returns to step S123 and the CPU 11 repeats the processing.

In step S125, the CPU 11 causes the mobile terminal 30 to display the mode selection screen 36A shown in FIG. 7 described above, as an example, and receives a mode selected by the user. In a case where the consumable information output mode is selected (in a case of the consumable information output mode), the step proceeds to step S126, and in a case where the processing execution mode is selected (in a case of the processing execution mode), the step proceeds to step S130.

In step S126, the CPU 11 sets the consumable information output mode.

In step S127, the CPU 11 outputs the consumable information to the mobile terminal 30. The consumable information includes, for example, the serial number and status ID obtained from the NDEF record shown in FIG. 10 described above. The output consumable information is displayed on the consumable information display screen 36B shown in FIG. 8 described above, as an example.

In step S128, the CPU 11 stops providing the notification (for example, displaying of a message, blinking of an LED indicator, or the like) started in step S122. At this time, the CPU 11 may perform control of displaying information, which indicates that the consumable information is output, on the display unit 16 of the image forming apparatus 10 after outputting the consumable information to the mobile terminal 30. The information, which indicates that the consumable information is output, is displayed on the consumable information output completed notification screen 16A shown in FIG. 11 described above, as an example.

In step S129, the CPU 11 determines whether or not an end timing has arrived. Examples of the end timing include a case where the main power of the image forming apparatus 10 is turned off, a case where the connection by the short-range wireless communication is disconnected, and the like. In a case where the CPU 11 determines that the end timing has not arrived (in a case of a negative determination), the step returns to step S121 and the CPU 11 repeats the processing, and in a case where the CPU 11 determines that the end timing has arrived (in a case of an affirmative determination), the CPU 11 ends a series of processing performed by the present information processing program 15A.

On the other hand, in step S130, the CPU 11 sets the processing execution mode.

In step S131, the CPU 11 executes processing (for example, printing or the like) instructed by the mobile terminal 30, and the step proceeds to step S128.

On the other hand, in step S132, the CPU 11 detects whether or not the image forming apparatus 10 is connected to the mobile terminal 30 via the short-range wireless communication. In a case where the CPU 11 detects that the image forming apparatus 10 is connected to the mobile terminal 30 via the short-range wireless communication (in a case of an affirmative determination), the step proceeds to step S133, and in a case where the CPU 11 does not detect that the image forming apparatus 10 is connected to the mobile terminal 30 via the short-range wireless communication (in a case of a negative determination), the step returns to step S121 and the CPU 11 repeats the processing.

In step S133, the CPU 11 sets the processing execution mode.

In step S134, the CPU 11 executes processing (for example, printing or the like) instructed by the mobile terminal 30, the step returns to step S121, and the CPU 11 repeats the processing.

Next, consumable order processing performed by the consumable management system 100 according to the first exemplary embodiment will be specifically described with reference to FIG. 14.

Figure 14:
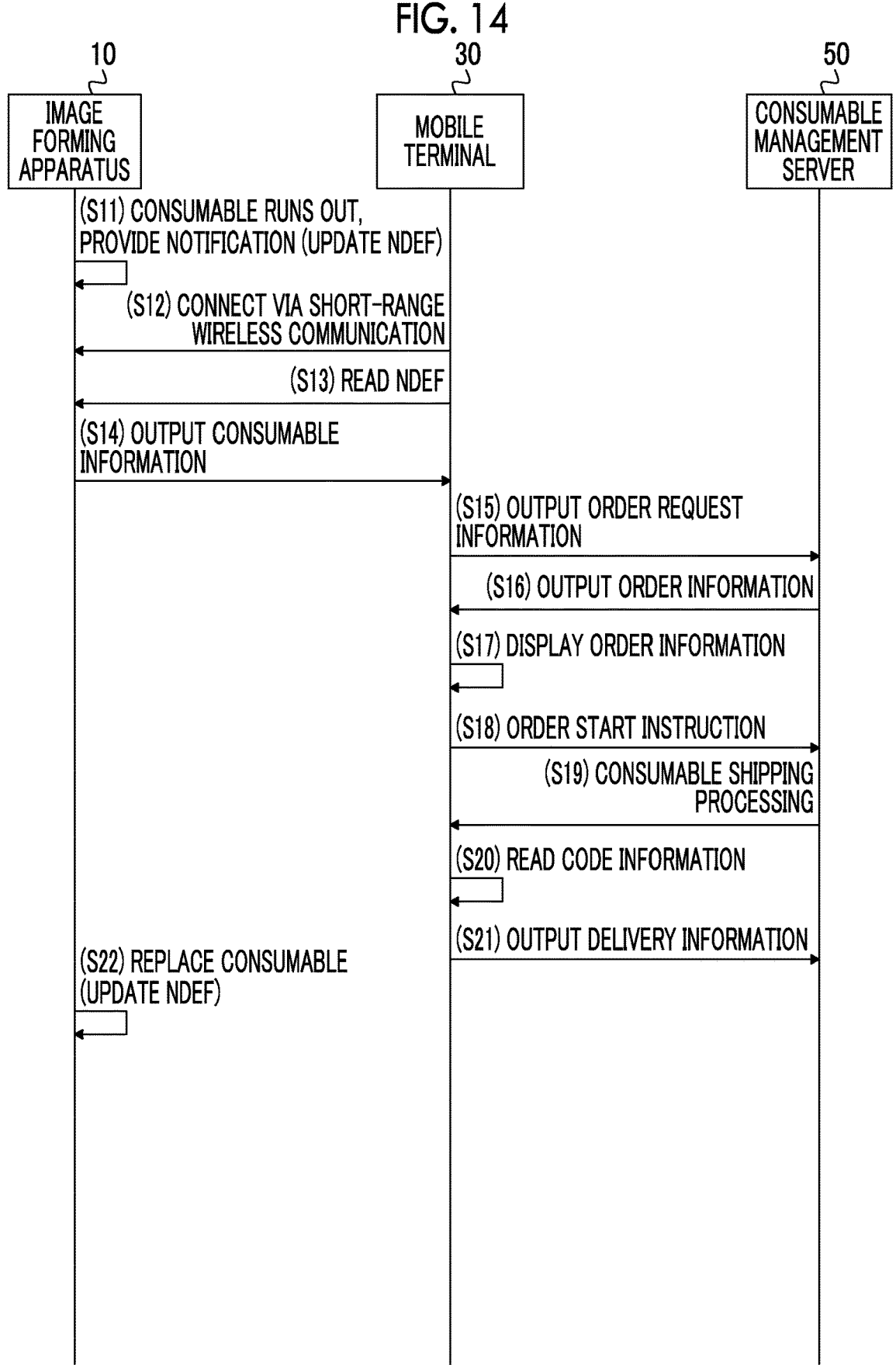
FIG. 14 is a sequence diagram showing an example of consumable order processing performed by the consumable management system according to the first exemplary embodiment.

FIG. 14 is a sequence diagram showing an example of the consumable order processing performed by the consumable management system 100 according to the first exemplary embodiment.

In (S11) of FIG. 14, in a case where the CPU 11 determines that a consumable has run out, that is, a level of consumption of the consumable meets the predetermined condition (for example, the remaining amount of the consumable is equal to or less than the threshold value, the time for replacing consumables has arrived, or the like), the image forming apparatus 10 provides a notification (for example, displaying of a message, blinking of an LED indicator, or the like) indicating that the consumable has run out and updates the NDEF record shown in FIG. 10 described above, as an example. That is, the consumable replacement flag in the NDEF record is set to "1".

In (S12), the CPU 11 detects that the image forming apparatus 10 is connected to the mobile terminal 30 via the short-range wireless communication in a state in which the above notification is being provided.

In (S13), the mobile terminal 30 executes the print management application 35A and reads the NDEF record (see FIG. 10) stored in the image forming apparatus 10.

In (S14), the image forming apparatus 10 outputs the consumable information including the serial number and the status ID in response to the reading from the mobile terminal 30, and the mobile terminal 30 displays the consumable information display screen 36B shown in FIG. 8 described above as an example.

In (S15), in a case where "Yes" on the consumable information display screen 36B shown in FIG. 8 is selected by the user, the mobile terminal 30 outputs consumable request information including the serial number and the status ID to the consumable management server 50.

In (S16), the consumable management server 50 accesses the customer information DB 60 based on the serial number and the status ID included in the consumable request information, acquires the shipping destination of the corresponding consumable, the model name of the image forming apparatus 10, the target consumable name, and the type number of the consumable (part type number), and outputs the order information, which includes the acquired shipping destination, model name, consumable name, type number of the consumable (part type number), and the number of consumables that is capable of being designated by the user (default is 1), to the mobile terminal 30.

Figure 15:
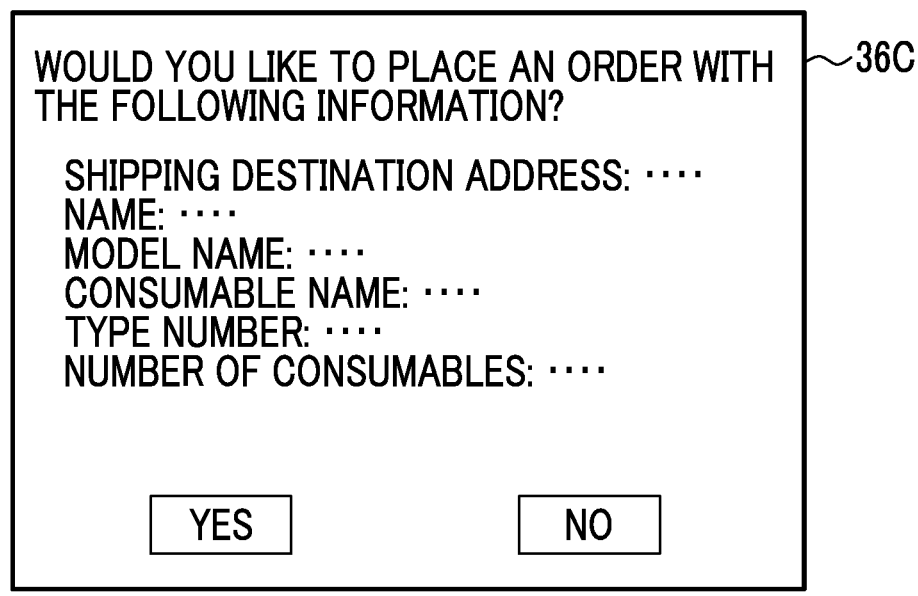
FIG. 15 is a front view showing an example of an order information display screen according to the exemplary embodiment.

In (S17), the mobile terminal 30 displays the order information acquired from the consumable management server 50, as shown in FIG. 15, as an example.

FIG. 15 is a front view showing an example of the order information display screen 36C according to the present exemplary embodiment.

The order information display screen 36C shown in FIG. 15 is displayed on the operation display unit 36 of the mobile terminal 30. As shown in FIG. 15, as the order information, the shipping destination (address, name) of the consumable, the model name of the image forming apparatus 10, the target consumable name, the type number of the consumable (part type number), and the number of consumables are displayed.

In (S18), in a case where "Yes" on the order information display screen 36C shown in FIG. 15 is selected by the user, the mobile terminal 30 instructs the consumable management server 50 to start ordering.

In (S19), in a case where the consumable management server 50 receives an order start instruction from the mobile terminal 30, the consumable management server 50 performs shipping processing for the consumable. That is, the processing of shipping the ordered consumable to a place designated as the shipping destination of the consumable is performed.

Figure 16:
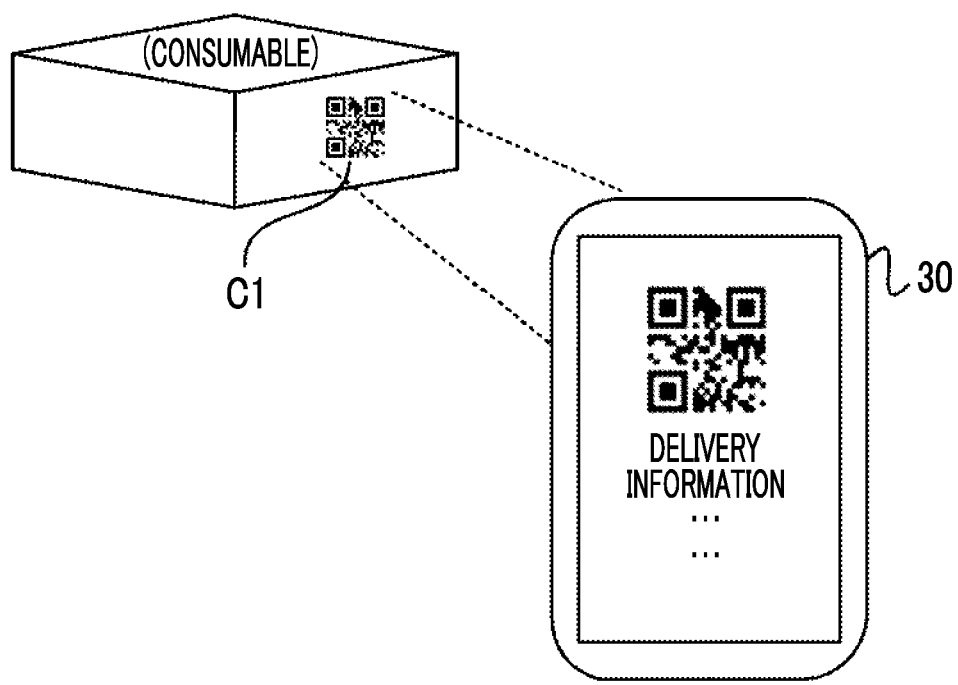
FIG. 16 is a diagram for describing processing of reading code information according to the exemplary embodiment.

In (S20), the mobile terminal 30 executes the print management application 35A, images the code information assigned to the consumable that is delivered to the designated place as shown in FIG. 16 as an example, and read the code information. Delivery information is assigned to the code information. The code information includes, for example, a barcode, a two-dimensional code, or the like.

FIG. 16 is a diagram for describing the processing of reading the code information according to the present exemplary embodiment.

As shown in FIG. 16, a two-dimensional code C1 is assigned to the consumable delivered to the designated place. The user images and reads the two-dimensional code C1 using the mobile terminal 30 and acquires the delivery information from the two-dimensional code C1.

In (S21), the mobile terminal 30 outputs the delivery information obtained from the read code information to the consumable management server 50. In this way, delivery processing of the consumable is completed.

In (S22), the user replaces the existing consumable of the image forming apparatus 10 with the delivered new consumable. At this time, the image forming apparatus 10 updates the NDEF record shown in FIG. 10 described above in response to the replacement of the consumable. That is, the consumable replacement flag in the NDEF record is returned to "0".

As described above, according to the present exemplary embodiment, by connecting the user's mobile terminal and the image forming apparatus via the short-range wireless communication, information necessary for ordering consumables is automatically acquired from the NDEF record that is stored in the image forming apparatus. Therefore, even in an environment where the image forming apparatus is not constantly connected to the consumable management server, placing an order for a consumable of the image forming apparatus may be easily performed by using the mobile terminal.

Second Exemplary Embodiment

In the above first exemplary embodiment, a mode for acquiring the serial number and the status ID from the NDEF record has been described. In the second exemplary embodiment, a mode in which the serial number and the status ID are acquired from a management information base (MIB) of a simple network management protocol (SNMP) will be described.

FIG. 17 is a diagram showing an example of the NDEF record according to the second exemplary embodiment. Data[B] and Data[C] are added to the NDEF record shown in FIG. 17 with respect to the comparative example shown in FIG. 9 described above. A connection code for connecting to the SNMP/MIB is stored in Data[B], and the consumable replacement flag is stored in Data[C] (an "isMaintenance" field). The SNMP is a communication protocol that defines a communication method for information of monitoring and controlling network devices on an IP network based on the DARPA model. The MIB is used in a case where remotely monitoring and managing devices by using the SNMP and is a database that stores device information indicating the settings or states of the devices to be monitored. The MIB (hereinafter referred to as "SNMP/MIB") is stored in, for example, the storage unit 15 of the image forming apparatus 10. In the present exemplary embodiment, the serial number and the status ID are stored in the SNMP/MIB.

Next, consumable order processing performed by the consumable management system 100 according to the second exemplary embodiment will be specifically described with reference to FIG. 18.

FIG. 18 is a sequence diagram showing an example of the consumable order processing performed by the consumable management system 100 according to the second exemplary embodiment.

In (S31) of FIG. 18, in a case where the CPU 11 determines that a consumable has run out, that is, a level of consumption of the consumable meets the predetermined condition (for example, the remaining amount of the consumable is equal to or less than the threshold value, the time for replacing consumables has arrived, or the like), the image forming apparatus 10 provides a notification (for example, displaying of a message, blinking of an LED indicator, or the like) indicating that the consumable has run out and updates the NDEF record shown in FIG. 17 described above, as an example. That is, the consumable replacement flag in the NDEF record is set to "1".

In (S32), the CPU 11 detects that the image forming apparatus 10 is connected to the mobile terminal 30 via the short-range wireless communication in a state in which the above notification is being provided.

In (S33), the mobile terminal 30 executes the print management application 35A and reads the NDEF record (see FIG. 17) stored in the image forming apparatus 10.

In (S34), the image forming apparatus 10 outputs the SNMP/MIB connection code to the mobile terminal 30 in response to the reading from the mobile terminal 30.

In (S35), the mobile terminal 30 connects to the SNMP/MIB stored in the image forming apparatus 10 based on the SNMP/MIB connection code acquired from the image forming apparatus 10.

In (S36), the image forming apparatus 10 outputs the consumable information including the serial number and the status ID in response to the SNMP/MIB connection from the mobile terminal 30, and the mobile terminal 30 displays the consumable information display screen 36B shown in FIG. 8 described above as an example.

In (S37), in a case where "Yes" on the consumable information display screen 36B shown in FIG. 8 is selected by the user, the mobile terminal 30 outputs consumable request information including the serial number and the status ID to the consumable management server 50.

In (S38), the consumable management server 50 accesses the customer information DB 60 based on the serial number and the status ID included in the consumable request information, acquires the shipping destination of the corresponding consumable, the model name of the image forming apparatus 10, the target consumable name, and the type number of the consumable (part type number), and outputs the order information, which includes the acquired shipping destination, model name, consumable name, type number of the consumable (part type number), and the number of consumables that is capable of being designated by the user (default is 1), to the mobile terminal 30.

In (S39), the mobile terminal 30 displays the order information acquired from the consumable management server 50, as shown in FIG. 15 described above, as an example.

In (S40), in a case where "Yes" on the order information display screen 36C shown in FIG. 15 is selected by the user, the mobile terminal 30 instructs the consumable management server 50 to start ordering.

In (S41), in a case where the consumable management server 50 receives an order start instruction from the mobile terminal 30, the consumable management server 50 performs shipping processing for the consumable. That is, the processing of shipping the ordered consumable to a place designated as the shipping destination of the consumable is performed.

In (S42), the mobile terminal 30 executes the print management application 35A, images the code information assigned to the consumable that is delivered to the designated place as shown in FIG. 16 described above as an example, and read the code information. Delivery information is assigned to the code information. The code information includes, for example, a barcode, a two-dimensional code, or the like.

In (S43), the mobile terminal 30 outputs the delivery information obtained from the read code information to the consumable management server 50. In this way, delivery processing of the consumable is completed.

In (S44), the user replaces the existing consumable of the image forming apparatus 10 with the delivered new consumable. At this time, the image forming apparatus 10 updates the NDEF record shown in FIG. 17 described above in response to the replacement of the consumable. That is, the consumable replacement flag in the NDEF record is returned to "0".

As described above, according to the present exemplary embodiment, by connecting the user's mobile terminal and the image forming apparatus via the short-range wireless communication, information necessary for ordering consumables is automatically acquired from the SNMP/MIB that is stored in the image forming apparatus. Therefore, even in an environment where the image forming apparatus is not constantly connected to the consumable management server, placing an order for a consumable of the image forming apparatus may be easily performed by using the mobile terminal.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

As described above, the image forming apparatus has been illustrated and described as the information processing apparatus according to the exemplary embodiment. The exemplary embodiment may be provided in a form of a program for causing a computer to execute the function of the information processing apparatus. The exemplary embodiment may be in the form of a non-transitory computer readable storing medium that stores these programs.

In addition, the configuration of the information processing apparatus described in the exemplary embodiment described above is an example and may be changed depending on the situation within a range that does not deviate from the gist.

Further, a flow of the processing of the program described in the exemplary embodiment is also an example and unnecessary steps may be deleted, new steps may be added, or the processing order may be exchanged within the range not deviating from the gist.

In addition, in the exemplary embodiment described above, the case where the processing according to the exemplary embodiment is realized by a software configuration using a computer by executing the program, but the exemplary embodiment is not limited thereto. The exemplary embodiment may be realized by, for example, a hardware configuration or a combination of the hardware configuration and the software configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
      in a case where a level of consumption of a consumable in the information processing apparatus meets a predetermined condition, provide a notification indicating that the level of consumption of the consumable meets the predetermined condition; and
      in a case where the information processing apparatus is connected to a mobile terminal via short-range wireless communication in a state in which the notification is being provided, notify the mobile terminal that the level of consumption of the consumable meets the predetermined condition and output consumable information, which indicates a prompt order for the consumable, to the mobile terminal.

2. The information processing apparatus according to claim 1, wherein the processor is configured to:
   in a case where the information processing apparatus is connected to the mobile terminal via the short-range wireless communication in a state in which the notification is not being provided, set a processing execution mode of executing predetermined processing.

3. The information processing apparatus according to claim 2, wherein the processor is configured to:
   in a case where the information processing apparatus is connected to the mobile terminal via the short-range wireless communication in a state in which the notification is being provided, enable switching between the processing execution mode and a consumable information output mode of outputting the consumable information.

4. The information processing apparatus according to claim 2, wherein the processor is configured to:
   in a case where the level of consumption of the consumable meets the predetermined condition, enable a default setting regarding whether to perform switching to the processing execution mode or a consumable information output mode of outputting the consumable information.

5. The information processing apparatus according to claim 1, wherein the processor is configured to:
   stop providing the notification after outputting the consumable information to the mobile terminal.

6. The information processing apparatus according to claim 2, wherein the processor is configured to:
   stop providing the notification after outputting the consumable information to the mobile terminal.

7. The information processing apparatus according to claim 3, wherein the processor is configured to:
   stop providing the notification after outputting the consumable information to the mobile terminal.

8. The information processing apparatus according to claim 4, wherein the processor is configured to:
   stop providing the notification after outputting the consumable information to the mobile terminal.

9. The information processing apparatus according to claim 5, wherein the processor is configured to:
   perform control to display information, which indicates that the consumable information is output, on a display unit of the information processing apparatus after outputting the consumable information to the mobile terminal.

10. The information processing apparatus according to claim 6, wherein the processor is configured to:
    perform control to display information, which indicates that the consumable information is output, on a display unit of the information processing apparatus after outputting the consumable information to the mobile terminal.

11. The information processing apparatus according to claim 7, wherein the processor is configured to:
    perform control to display information, which indicates that the consumable information is output, on a display unit of the information processing apparatus after outputting the consumable information to the mobile terminal.

12. The information processing apparatus according to claim 8, wherein the processor is configured to:
    perform control to display information, which indicates that the consumable information is output, on a display unit of the information processing apparatus after outputting the consumable information to the mobile terminal.

13. The information processing apparatus according to claim 5, wherein the processor is configured not to:
    after outputting the consumable information to the mobile terminal, in a case where the information processing apparatus is connected again to the mobile terminal via the short-range wireless communication, output the consumable information again to the mobile terminal.

14. The information processing apparatus according to claim 1,
    wherein the consumable information includes serial information for uniquely identifying the information processing apparatus and status information indicating that the information processing apparatus is in a state in which replacement or replenishment of the consumable is needed.

15. The information processing apparatus according to claim 14, wherein the short-range wireless communication is NFC, and the serial information and the status information are stored in an NDEF that is a data format used for reading and writing data by the NFC.

16. A consumable management system comprising:

the information processing apparatus according to claim 1;

a mobile terminal configured to be connected to the information processing apparatus via short-range wireless communication; and a consumable management server connected to the mobile terminal via a network, wherein a processor of the mobile terminal is configured to:
   output order request information for requesting an order for a consumable to the consumable management server according to consumable information acquired from the information processing apparatus, and a processor of the consumable management server is configured to:
   output order information including a shipping destination of the consumable, a consumable name, and the number of consumables to the mobile terminal according to the order request information acquired from the mobile terminal.

17. The consumable management system according to claim 16, wherein the processor of the consumable management server is configured to:

perform processing of shipping the consumable to a place designated as the shipping destination of the consumable in a case where an order start instruction for the order information is received from the mobile terminal, and the processor of the mobile terminal is configured to:
   read code information assigned to the consumable delivered to the place and output delivery information obtained from the read code information to the consumable management server.

18. A mobile terminal that is configured to be connected to the information processing apparatus according to claim 1 via short-range wireless communication and connected to a consumable management server via a network, wherein a processor of the mobile terminal is configured to:

output order request information for requesting an order for a consumable to the consumable management server according to consumable information acquired from the information processing apparatus, acquire order information including a shipping destination of the consumable, a consumable name, and the number of consumables for the order request information, from the consumable management server, output an order start instruction for the order information to the consumable management server, and in a case where the consumable management server performs processing of shipping the consumable to a place designated as the shipping destination of the consumable in response to the order start instruction, read code information assigned to the consumable delivered to the place and output delivery information obtained from the read code information to the consumable management server.

19. A non-transitory computer readable medium storing an information processing program for causing a computer to execute:

in a case where a level of consumption of a consumable in an information processing apparatus meets a predetermined condition, providing a notification indicating that the level of consumption of the consumable meets the predetermined condition; and in a case where the information processing apparatus is connected to a mobile terminal via short-range wireless communication in a state in which the notification is being provided, notifying the mobile terminal that the level of consumption of the consumable meets the predetermined condition and outputting consumable information, which indicates a prompt order for the consumable, to the mobile terminal.

20. An information processing method comprising:

in a case where a level of consumption of a consumable in an information processing apparatus meets a predetermined condition, providing a notification indicating that the level of consumption of the consumable meets the predetermined condition; and in a case where the information processing apparatus is connected to a mobile terminal via short-range wireless communication in a state in which the notification is being provided, notifying the mobile terminal that the level of consumption of the consumable meets the predetermined condition and outputting consumable information, which indicates a prompt order for the consumable, to the mobile terminal.

\* \* \* \* \*